No. 888,557. PATENTED MAY 26, 1908.
H. L. VAN VALKENBURG.
SYSTEM OF ELECTRICAL CONTROL.
APPLICATION FILED SEPT. 2, 1904.
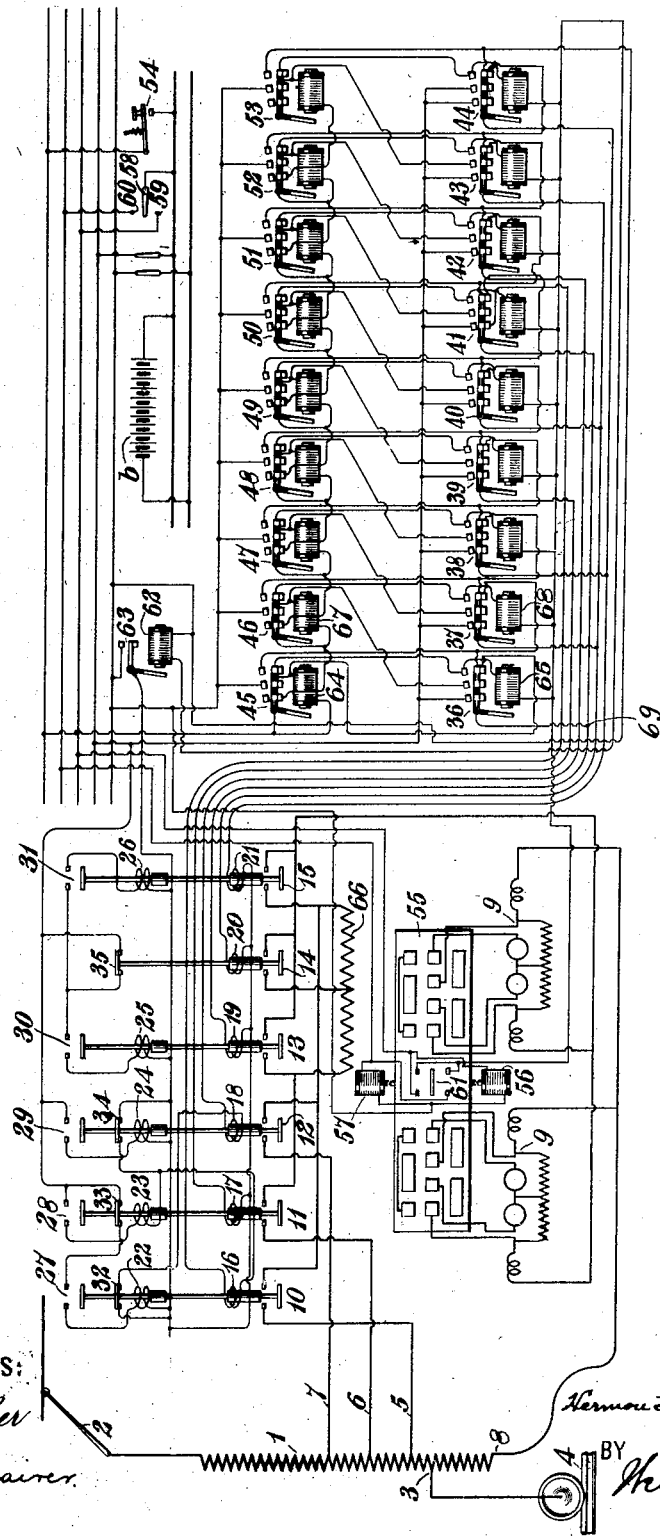
WITNESSES:
INVENTOR
ATTORNEY

UNITED STATES PATENT OFFICE.

HERMON L. VAN VALKENBURG, OF PITTSBURG, PENNSYLVANIA, ASSIGNOR TO WESTINGHOUSE ELECTRIC & MANUFACTURING COMPANY, A CORPORATION OF PENNSYLVANIA.

SYSTEM OF ELECTRICAL CONTROL.

No. 888,557.  Specification of Letters Patent.  Patented May 26, 1908.

Application filed September 2, 1904. Serial No. 223,140.

*To all whom it may concern:*

Be it known that I, HERMON L. VAN VALKENBURG, a citizen of the United States, and a resident of Pittsburg, in the county of Allegheny and State of Pennsylvania, have invented a new and useful Improvement in Systems of Electrical Control, of which the following is a specification.

My invention relates to systems of control for electrical translating devices, and it is particularly applicable to such electric railway control systems as employ electrically controlled unit switches in the circuits of the propelling motors.

The object of my invention is to provide means for effecting step-by-step or successive operation of the unit switches by successive operation of a manually controlled master switch.

A further object is to materially simplify and lighten the apparatus required to control electric railway motors.

The single figure of the accompanying drawing represents, diagrammatically, a system constructed in accordance with my invention.

One terminal of an auto-transformer winding 1 is connected, directly or indirectly, to a trolley 2 and an intermediate point 3, near its other terminal, is connected to the rail or grounded conductor 4. The auto-transformer winding 1 is subdivided by means of leads 5, 6 and 7, between which and terminal 8, motors 9 or other translating devices are adapted to be connected, the circuits through the motors being governed by means of electrically operated switches 10, 11, 12, 13, 14 and 15.

While I have shown the motors 9 as supplied with energy from an auto-transformer, it is to be understood that a two-winding transformer may be employed instead, the secondary winding of which is subdivided in a manner similar to that here shown, or that the motors may be supplied from a source of direct current energy, the operation of my invention not being dependent upon the character of the energy supplied to the motors or upon the specific means employed for supplying energy thereto.

The switches 10, 11, 12, 13, 14 and 15 are shown as operated by means of magnet coils 16, 17, 18, 19, 20 and 21, respectively, though, if desired, they may be operated pneumatically, the said coils serving to operate valves which control the supply of elastic fluid to the operating cylinders. Switches 10, 11, 12, 13 and 15 are respectively provided with magnet coils 22, 23, 24, 25 and 26, the circuits of which are completed, by means of interlocking switches 27, 28, 29, 30 and 31, respectively, when the said main switches are closed, and retain the switches in their closed positions when the remainder of the circuits of the control system are properly established.

Interlocking switches 32, 33, 34 and 35 are operated by means of the switches 10, 11, 12 and 14, respectively, all of these switches opening when the corresponding main switches are closed. Interlocking switch 32 prevents energizing of the magnet coil 18 while the main switch 10 is closed and interlocking switch 34 prevents energizing of the magnet coil 16 when the main switch 12 is in a closed position. Interlocking switch 33 prevents energizing of the retaining magnet coil 22 when the main switch 11 is closed and interlocking switch 35 prevents energizing of the retaining magnet coils 25 and 26 when the main switch 14 is closed.

The circuits of the operating magnet coils 16, 17, etc., are governed by means of a set of relay switches 36, 37, 38, 39, 40, 41, 42, 43 and 44, the circuits of the operating magnet coils of which are governed by means of a second set of relay switches 45, 46, 47, 48, 49, 50, 51, 52 and 53. By the successive closing of the master switch 54, the operating magnet coils of the relay switches 45, 46, etc., are successively energized from a battery or other suitable source of electrical energy b, if the remainder of the circuits of the control system are properly established, as will be hereinafter more fully set forth.

The reversing switch 55, which governs the circuits of the motors or other translating devices 9, is operated by means of magnet coils 56 and 57, the circuits of the magnet coils being governed by means of a switch-arm 58, which is adapted to make contact with either of contact terminals 59 or 60, the magnet coil 56 being energized if the switch-arm 58 engages the contact terminal 59 and the magnet coil 57 being energized if the arm 58 engages the contact terminal 60.

Mounted upon and operated by the reversing switch 55, is a switch 61, which governs the circuit of an operating coil 62 for a switch 63. The operating magnet coil 62 cannot be energized until the reversing switch 55 is in either its forward or its reverse position and the switch 63, which governs the supply of energy to the main switch operating and retaining magnet coils, cannot be closed. The interlocking switch 61 serves also to prevent energizing of the operating magnet windings of the relay switches 36 to 44, inclusive, unless the reversing switch occupies either its forward or its reverse position.

To effect operation of my system, the switch-arm 58 must first be moved to make contact with either terminal 59 or terminal 60, thereby causing movement of the reversing switch 55 to either its forward or its reverse position, as desired. The operation of the reversing switch 55 also effects operation of the switch 61, thereby completing the circuit of the operating magnet coil 62 and closing the switch 63, so that energy may now be supplied to the operating and retaining magnet coils of the main switches 10, 11, 12, etc. Then if the master switch 54 is closed, a circuit is established from the positive terminal of the battery $b$, through the master switch 54, the relay operating coil 64, right-hand contact terminals of switches 36 to 44, inclusive, in their lowermost positions, to the negative terminal of the battery $b$. Energizing of the coil 64 causes the switch 45 to occupy its uppermost position and a circuit is thereby established from the positive terminal of the battery, through switches 58 and 61, relay magnet coil 65, right-hand contact terminals of relay switch 45 in its uppermost position and right-hand contact terminals of switches 37 to 44, inclusive, in their uppermost positions, to the negative terminal of the battery. When the switch 45 is moved to its uppermost position, the circuit which was previously established through the operating coil 64 is interrupted and a circuit established from the positive terminal of the battery, through the master switch 54, operating coil 64 and the middle contact terminals of the relay switch 45 in its uppermost position, to the negative terminal of the battery. This circuit remains established so long as the master switch 54 is held in the closed position. Switch 36 is moved to its uppermost position by the energizing of the coil 65 and thereby completes a circuit from the positive terminal of the battery, through the left-hand contact terminals of the switch 36 in its uppermost position, to the point 69, where the circuit divides, one portion traversing operating magnet winding 19 and switch 63 to the negative terminal of the battery, and the other portion traversing the left-hand contact terminals of the switch 41 in its lowermost position, operating magnet winding 16, interlocking switch 34 and switch 63, to the negative terminal of the battery. Switches 10 and 13 are then closed and energy is supplied to the translating devices 9 from the lead 5 of the auto-transformer winding 1, through switch 10, resistance 66, switch 13, reversing switch 55, and motors 9, to the terminal 8 of the auto-transformer winding 1. When the relay switch 36 is moved to its uppermost position, the circuit previously established through the operating coil 65 is changed, the circuit then established being from the positive terminal of the battery, switches 58 and 61, operating coil 65, right-hand contact terminals of the switch 36 in its uppermost position and right-hand contact terminals of the switches 37 to 44, inclusive, in their lowermost positions. Thus the circuit of the operating coil 65 is maintained and the switch 36 is held in its uppermost position while the reversing switch occupies either its forward or its reverse position. When the master switch 54 is again opened, the switch 45 drops to its lowermost position, and if the master switch is again closed, a circuit is established from the positive terminal of the battery, through the master switch 54, left hand contact terminals of the relay switch 45 in its lowermost position, operating coil 67, middle contact terminals of the switch 36 in its uppermost position, right-hand contact terminals of switches 37 to 44, inclusive, in their lowermost positions, to the negative terminal of the battery. Energizing of the coil 67 effects movements of the switch 46 to its uppermost position, which thereby reëstablishes the circuit of the operating coil 67 from the positive terminal of the battery, through the master switch 54, right-hand contact terminals of the relay switch 45 in its lowermost position, the operating coil 67 and the middle contact terminals of the relay switch 46 in its uppermost position, to the negative terminal of the battery. It also establishes a circuit from the positive terminal of the battery, through switches 58 and 61, operating coil 68, right-hand contact terminals of switch 46 in its uppermost position and right-hand contact terminals of relay switches 38 to 44, inclusive, in their lowermost positions, to the negative terminal of the battery. Energizing of the coil 68 causes movement of the relay switch 37 to its uppermost position and thereby establishes a circuit from the positive terminal of the battery, through left-hand contact terminals of the relay switch 37 in its uppermost position, operating magnet winding 20 and switch 63, to the negative terminal of the battery. The operating magnet winding 20 is then energized and the switch 14 is operated to remove a portion of the resistance 66 from the motor circuit.

If the switch 54 is opened and closed successively, the operation of the sets of relay switches 36, 37, 38, etc., and 45, 46, 47, etc., continues in a manner similar to that just described. In the further operation of the system, the main switches 10 and 15, 11 and 15, 11 and 14, 12 and 13, 12 and 14 and 12 and 15 are closed in the order just recited. In order to return the system to its original condition, it is only necessary to open the switch 38.

While I have shown specific devices and arrangements of their connections, I desire it to be understood that these are only illustrative of the combinations which are possible with the elements comprising my system, and I wish my invention to be construed to cover any other operative arrangement and connections of the elements herein shown and described.

I claim as my invention:

1. In a system of control, the combination with main and auxiliary sources of electrical energy, a translating device or devices, and unit switches in the circuits thereof, of operating and retaining coils for said unit switches, interlocking switches which are operated by the unit switches, a set of electrically operated relay switches which govern the circuits of the operating coils, a second set of electrically operated relay switches in the operating circuits of the aforesaid relay switches and a master switch which controls the operating circuits of the last named relay switches.

2. In a system of control, the combination with main and auxiliary sources of electrical energy, a translating device or devices and unit switches in the circuits thereof, of operating and retaining coils for said unit switches, interlocking switches which are operated by the unit switches, a set of electrically operated relay switches which govern the circuits of the operating coils, a second set of electrically operated relay switches in the operating circuits of the aforesaid relay switches, a master switch which controls the operating circuits of the last named relay switches and an electrically operated interlocking switch which is in the circuit of the said operating and retaining coils.

3. In a system of control, the combination with main and auxiliary sources of electrical energy, a translating device or devices and unit switches in the circuits thereof, of operating and retaining coils for said unit switches, interlocking switches which are operated by the unit switches, a set of electrically operated relay switches which govern the circuits of the operating coils, a second set of electrically operated relay switches in the circuits of the aforesaid relay switches, a master switch which controls the operating circuits of the last named relay switches, an electrically operated interlocking switch which is in the circuit of the said operating and retaining coils and a reversing switch which controls the operating circuit thereof and the circuits of the said translating device or devices.

4. In a system of control, the combination with main and auxiliary sources of electrical energy, a translating device or devices and unit switches in the circuits thereof, of operating coils which control said unit switches, retaining coils for said unit switches, interlocking switches which are operated by the unit switches, a set of electrically operated relay switches which govern the circuits of the operating coils, a second set of electrically operated relay switches in the operating circuits of the aforesaid switches and a master switch which controls the operating circuits of the last named set of switches.

5. In a system of control, the combination with a source or sources of electrical energy, a translating device or devices, and electrically operated switches in the circuits thereof, of a set of electrically operated relay switches which govern the operating circuits of the aforesaid switches, a second set of electrically operated relay switches in the operating circuits of the aforesaid relay switches and a master switch which controls the operating circuits of the last named set of relay switches.

6. In a system of control, the combination with a source or sources of electrical energy, a translating device or devices and unit switches in the circuits thereof, of operating and retaining coils for said unit switches, a set of electrically operated relay switches which govern the circuits of the operating coils, a second set of electrically operated relay switches in the operating circuits of the aforesaid relay switches and a master switch which controls the operating circuits of the last named set of relay switches.

7. In a system of control, the combination with a source or sources of electrical energy, a translating device or devices, and switches in the circuits thereof, of operating and retaining coils for said switches, a set of electrically operated relay switches in the circuits of said operating coils, a second set of relay switches which control the operating circuits of the aforesaid set and a master switch in the operating circuits of the last named set of switches by the successive closing of which the said set of switches may be operated successively.

8. In a system of control, the combination with a source or sources of electrical energy, a translating device or devices and unit switches in the circuits thereof, of operating and retaining coils for said unit switches, a set of electrically operated relay switches which govern the circuits of the operating coils, a second set of electrically operated relay switches in the operating circuits of the aforesaid relay switches, a master switch which controls the operating circuits of the last named set of relay switches, a reversing switch in the circuits of said translating device or devices and an electrically operated interlocking switch in the circuits of said operating and retaining coils, the circuit of which is controlled by the operation of said reversing switch.

9. In a system of control, the combination with a source or sources of electrical energy, a translating device or devices and unit switches in the circuits thereof, of operating and retaining coils for said unit switches, a reversing switch in the circuits of the said translating device or devices and an electrically operated interlocking switch in the circuit of the operating and retaining coils, the operation of which is controlled by the operation of said reversing switch.

10. In a system of control, the combination with a source or sources of electrical energy, a translating device or devices and unit switches in the circuits thereof, of operating and retaining coils for said unit switches, a reversing switch in the circuits of the said translating device or devices and means for preventing energizing of the retaining coils unless the reversing switch is in either its forward or its reverse position.

11. In a system of control, the combination with a source of electrical energy, a translating device or devices and switches in the circuits thereof, of operating coils for said switches, controlling means for said operating coils, a master switch governing said means, a reversing switch in the circuits of the said translating device or devices, and means for preventing energizing of said operating coils unless the reversing switch is in either its forward or its reverse position.

12. In a system of control, the combination of a series of main circuit switches, a series of interlocking switches operated thereby, a series of relay switches, and a master switch.

13. In a system of control, the combination of a series of main circuit switches, a series of interlocking switches operated thereby, a series of relay switches, a reversing switch and a master switch.

14. In a system of control, the combination of a series of main circuit switches, a series of interlocking switches operated thereby, a series of relay switches, a reversing switch, an interlocking switch operated thereby, and a master switch.

15. In a system of control, the combination of a series of main circuit switches, a series of interlocking switches operated thereby, a series of relay switches, a reversing switch, means governed thereby for preventing the operation of certain of said relay switches until the reversing switch has been moved to either its forward or its reverse position, and a master switch.

16. In a system of control, the combination with a set of main circuit closing switches, of a set of interlocking switches operated thereby which prevent the simultaneous closure of alternate switches of said main set.

17. In a system of control, the combination with a translating device, main switches and a reversing switch in the circuits thereof, of two sets of electrically operated relay switches, and means operated by the reversing switch for preventing the operation of one set of said relay switches until the reversing switch has been moved to either its forward or its reverse position.

18. In a system of control, the combination of main circuit switches, operating and retaining magnet windings therefor, interlocking switches operated thereby, relay switches, a reversing switch, means governed thereby for preventing the operation of certain of said relay switches and the energizing of the retaining magnet windings until the reversing switch has been moved to either its forward or its reverse position, and a master switch.

19. In a system of control, the combination of a set of main circuit switches, operating and retaining magnet windings therefor, a set of interlocking switches operated by certain of said switches to control circuits to corresponding retaining magnet windings, and a set of relay switches.

20. In a system of control, the combination of main circuit switches, operating and retaining magnet windings therefor, interlocking switches operated by said switches which control circuits to the corresponding retaining magnet windings and which prevent simultaneous closure of certain of said switches, circuit changing switches, operating magnet windings therefor, and interlocking switches which prevent simultaneous closure of said switches.

In testimony whereof, I have hereunto subscribed my name this 23rd day of August 1904.

HERMON L. VAN VALKENBURG.

Witnesses:
OTTO S. SCHAIRER,
H. A. SCHAUB.